(12) United States Patent
Kuroda et al.

(10) Patent No.: US 8,076,465 B2
(45) Date of Patent: Dec. 13, 2011

(54) METHOD FOR MANUFACTURING CHARGE CONTROL AGENT

(75) Inventors: Kazuyoshi Kuroda, Neyagawa (JP); Masashi Yasumatsu, Neyagawa (JP); Osamu Yamate, Neyagawa (JP); Kaori Sato, Neyagawa (JP); Jun Hikata, Neyagawa (JP)

(73) Assignee: Orient Chemicals Industries, Lt., Osaka (JP)

( * ) Notice: Subject to any disclaimer, the term of this patent is extended or adjusted under 35 U.S.C. 154(b) by 1460 days.

(21) Appl. No.: 10/959,069

(22) Filed: Oct. 7, 2004

(65) Prior Publication Data

US 2005/0084786 A1    Apr. 21, 2005

(30) Foreign Application Priority Data

Oct. 15, 2003   (JP) .................. 2003-354782

(51) Int. Cl.
*C09B 45/32* (2006.01)
(52) U.S. Cl. ....................................... 534/602
(58) Field of Classification Search ........................ None
See application file for complete search history.

(56) References Cited

U.S. PATENT DOCUMENTS

| | | | | |
|---|---|---|---|---|
| 4,563,409 A * | 1/1986 | Suzuki et al. | ............ | 430/108.23 |
| 4,624,907 A * | 11/1986 | Niimura et al. | .......... | 430/108.23 |
| 5,843,611 A * | 12/1998 | Sukata et al. | ............ | 430/108.23 |
| 5,976,749 A * | 11/1999 | Sukata et al. | ............. | 430/108.3 |
| 6,153,735 A * | 11/2000 | Sukata et al. | ................. | 534/713 |
| 6,197,467 B1 * | 3/2001 | Yamanaka et al. | ........ | 430/108.23 |
| 6,548,648 B1 * | 4/2003 | Yasumatsu et al. | ........... | 534/602 |
| 6,756,485 B2 * | 6/2004 | Yasumatsu et al. | ........... | 534/581 |
| 7,094,513 B2 * | 8/2006 | Yasumatsu et al. | ...... | 430/108.23 |
| 7,342,062 B2 * | 3/2008 | Tada et al. | ..................... | 524/190 |
| 7,413,837 B2 * | 8/2008 | Yasumatsu et al. | ...... | 430/108.23 |
| 7,479,360 B2 * | 1/2009 | Yasumatsu et al. | ........ | 430/108.3 |
| 2001/0004667 A1 * | 6/2001 | Okubo et al. | ................. | 534/692 |
| 2003/0187234 A1 * | 10/2003 | Yasumatsu et al. | ........... | 534/715 |

FOREIGN PATENT DOCUMENTS

| | | |
|---|---|---|
| JP | 61-155463 | 7/1986 |
| JP | 61-155464 | 7/1986 |
| JP | 07-97530 | 4/1995 |
| JP | 2004-097618 | 4/2004 |
| JP | 2004-199039 | 7/2004 |
| WO | WO 03/081341 A1 | 10/2003 |
| WO | WO 2004/049076 A1 | 6/2004 |

* cited by examiner

*Primary Examiner* — Fiona T Powers
(74) *Attorney, Agent, or Firm* — Steptoe & Johnson LLP

(57) ABSTRACT

A method for manufacturing a charge control agent comprising steps of:

an initiative chelating step by reacting with a monoazo compound represented by the following chemical formula [1]

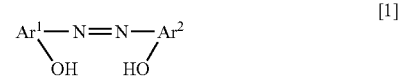

[1]

(in the chemical formula [1], —$Ar^1$— and —$Ar^2$— are aromatic groups) and a metal chelating agent to prepare an azo-type metal complex salt intermediate;

a subsequent ion-exchanging step by reacting with the azo-type metal complex salt intermediate and an ammonium counter ion forming agent including an inorganic ammonium salt and aqueous ammonia to prepare an azo-type metal complex salt having an ammonium ion of a counter ion represented by the following chemical formula [2]

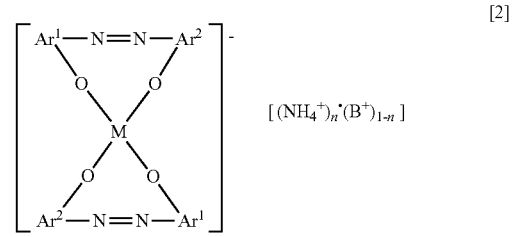

[2]

(in the chemical formula [2], —$Ar^1$— and —$Ar^2$— are the same as the chemical formula [1]; M is a trivalent metal; $B^+$ is a cation except an ammonium ion; n is from 0.70 to 1.00).

8 Claims, No Drawings

METHOD FOR MANUFACTURING CHARGE CONTROL AGENT

BACKGROUND OF THE INVENTION

This invention relates to a method for manufacturing a charge control agent including an azo-type metal complex having an ammonium ion of a counter ion, which is used for a toner for developing an electrostatic image or a powder paint.

An electrophotography system applied to a copy machine, printer or facsimile performs to develop an electrostatic latent image on a photosensitive frame by toner having frictional electrification, and to transfer and then fix the imaged toner onto a paper.

A charge control agent is added to the toner beforehand so as for the toner to quicken a rise speed of the electrification, electrify sufficiently, control a proper quantity of the electrification stably, improve electrification property, rise up a speed for developing the electrostatic latent image, and form the vivid images.

For instance, as the charge control agent, azo-type metal complex salts are mentioned in Japanese Patent Provisional Publication No. 61-155464.

The copy machine or the printer brings lately about high efficiency with improving resolution and so on. The electrophotography system is used for not only a high speed development but also a low speed development, as purposes are expanded. Therefore, it is required that the charge control agent causes the faster rise speed of the electrification of the toner and excellent electrification property and is able to form the vivid images of high resolution. And it is required that the charge control agent is able to be used for a powder paint for a electrostatic powder printing method which the powder paint is attracted and baked onto a surface of a frame-work having a charge, and causes excellent electrification properties.

The charge control agent including the azo-type metal complex salt having an ammonium counter ion with only a low content causes insufficiently electrification properties.

It is desired the charge control agent including the azo-type metal complex salt having the ammonium counter ion with the high content so as to improve the electrification properties much. Nevertheless it was difficult to manufacture the charge control agent with the high content at high purity.

SUMMARY OF THE INVENTION

The present invention has been developed to solve the foregoing problems.

It is an object of the present invention to provide a method for manufacturing a charge control agent including an azo-type metal complex salt having an ammonium ion of a counter ion with a high content at high purity efficiently and simply.

A method for manufacturing a charge control agent of the present invention developed for accomplishing the foregoing object, comprises steps of:

an initiative chelating step by reacting with a monoazo compound represented by the following chemical formula [1]

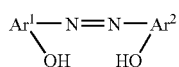

(in the chemical formula [1], —$Ar^1$— and —$Ar^2$— are same or different to each other, and aromatic groups being to have a substitutional group; and H of a hydroxyl group (—OH) may be substituted with an alkali metal, $NH_4$ and so on) and a trivalent metal chelating agent preferably an iron chelating agent, to prepare an azo-type metal complex salt intermediate;

a subsequent ion-exchanging step by reacting with the azo-type metal complex salt intermediate and an ammonium counter ion forming agent including an inorganic ammonium salt and aqueous ammonia to prepare an azo-type metal complex salt having an ammonium ion of a counter ion represented by the following chemical formula [2]

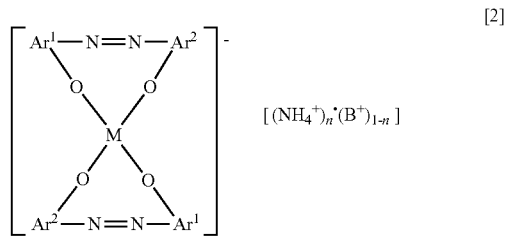

(in the chemical formula [2], —$Ar^1$— and —$Ar^2$— are the same as the chemical formula [1];

M is a trivalent metal;

$B^+$ is a cation such as a sodium ion and a hydrogen ion, except an ammonium ion;

n is from 0.70 to 1.00).

According to the method, the azo-type metal complex salt wherein n is 0.70 or more, preferably 0.85 or more, further preferably 0.90 or more is manufactured with high purity in short time.

It is preferable that the ammonium counter ion forming agent is a mixture including both of 1 to 20 equivalents of the inorganic ammonium salt and 0.5 to 20 equivalents of the aqueous ammonia to 1 equivalent of the azo-type metal complex salt intermediate respectively.

It is preferable that the ammonium counter ion forming agent is the mixture including the inorganic ammonium salt and a solution of the aqueous ammonia. Examples of the inorganic ammonium salt are ammonium chloride, ammonium nitrate, ammonium phosphate and ammonium sulfate, and examples of the solution of the aqueous ammonia are approximate 28% of concentrated aqueous ammonia, dilute aqueous ammonia, and alcoholic aqueous ammonia containing these solution or ammonia. The inorganic ammonium salt of the ammonium counter ion forming agent may be prepared by addition of the aqueous ammonia and a agent having a corresponding anion in the reaction mixture.

The inorganic ammonium salt may be the mixture of a plurality of the above examples. It is further preferable that inorganic ammonium salt is ammonium chloride or ammonium sulfate.

When the ammonium counter ion forming agent is the mixture of the inorganic ammonium salt and the aqueous ammonia, a ratio of the ammonium counter ion content that is corresponded to n in the azo-type metal complex represented by the above chemical formula [2] is 70 mol %, preferably 85 mol %, further preferably 90 mol % or more, and high. It is guessed that highness of the ratio is caused by promoting the ion-exchanging reaction because of keeping alkaline of the reaction mixture appropriately. The ratio of the ammonium counter ion content of the azo-type metal complex salt prepared using the mixture of the inorganic ammonium salt and the aqueous ammonia as ammonium counter ion forming agent is several times or several dozen times higher than the ratio of the ammonium counter ion content of the azo-type metal complex salt prepared using only one thereof.

It is preferable that after dropwise addition of the ammonium counter ion forming agent, pH of the reaction mixture is controlled higher than 8.0 by the dropwise addition. It is further preferable that after the ion-exchanging, pH of the reaction mixture is controlled higher than 8.0 by the ammonium counter ion forming agent. When the reaction mixture is alkaline, the ratio of the ammonium counter ion content is 70 mol %, preferably 85 mol %, further preferably 90 mol % or more and high. It is guessed that promoting the ion-exchanging causes highness of the ratio.

The charge control agent having without this range of n causes poor electrification property. For instance, as the electrostatic image is developed at lower speed, the rise speed of the electrification is slower and the quantity of the electrification is shorter.

In the initiative chelating step and the subsequent ion-exchanging step of the method for manufacturing the charge control agent, a solvent such as water, an organic solvent, a mixed solvent of water and the organic solvent is used.

It is preferable that the initiative chelating step and the subsequent ion-exchanging step are executed in the solvent such as mixed organic solvent for instance the mixed solvent of water and a hydrophilic organic solvent. When the steps are executed in these solvents, the reaction is promoted. The prepared charge control agent has particles of fine average size and hardly aggregation. And the prepared charge control agent is blended to disperse with remaining its fineness in a toner homogeneously, because of a little residual solvent.

Examples of the organic solvent are the hydrophilic organic solvent, an amide-type solvent, an ether-type solvent, a ketone-type solvent, a sulfoxide-type solvent, and an aromatic-type solvent being to have a substitutional group.

It is preferable that the hydrophilic organic solvent is an alcohol solvent or a glycol solvent. Examples of the hydrophilic organic solvent are monohydric alcohol and dihydric alcohol. Concretely examples of the monohydric alcohol are alcohols such as ethanol, n-propanol, isopropanol, n-butanol, amyl alcohol, benzyl alcohol, cyclohexanol and diacetone alcohol; glycol monoalkyl ethers such as ethylene glycol monomethyl ether, ethylene glycol monoethyl ether, propylene glycol monoethyl ether, diethylene glycol monoethyl ether, diethylene glycol monobutyl ether and dipropylene glycol monoethyl ether; glycol monoacetates such as ethylene glycol monoacetate and propylene glycol monoacetate. Concretely examples of the dihydric alcohol are glycols such as ethylene glycol, diethylene glycol, trimethylene glycol, triethylene glycol, tetraethylene glycol, polyethylene glycol, propylene glycol and butanediol.

It is further preferable that the hydrophilic organic solvent is the alcohols having 1 to 6 carbons or the glycols having 2 to 18 carbons which especially are hydrophilic with the azo-type metal complex salt intermediate.

When at least the subsequent ion-exchanging step is executed in the solvent including the organic solvent such as methanol, butanol, a mixed solvent of methanol-water or butanol-water that mix proportion by weight is 0.1-30:99.9-70 under refluxing preferably, the ratio of the ammonium counter ion content of the azo-type metal complex salt is increased higher. It is guessed that the highness of the ratio is caused by promoting of the ion-exchanging because the solubility of the azo-type metal complex salt and the ammonium counter ion forming agent is improved. It is preferable that butanol is n-butanol.

In the method for manufacturing the charge control agent, it is further preferable that the trivalent metal chelating agent is an iron(III) chelating agent and the azo-type metal complex salt having the ammonium ion of the counter ion of the above chemical formula [2] is represented by the following chemical formula [3]

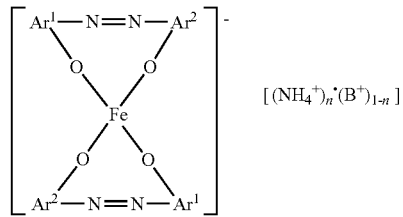

(in the chemical formula [3], —$Ar^1$—, —$Ar^2$—, $B^+$ and n are the same as the chemical formula [2]).

It is furthermore preferable that the azo-type metal complex salt having the ammonium ion of the counter ion of the above chemical formula [3] is represented by the following chemical formula [4]

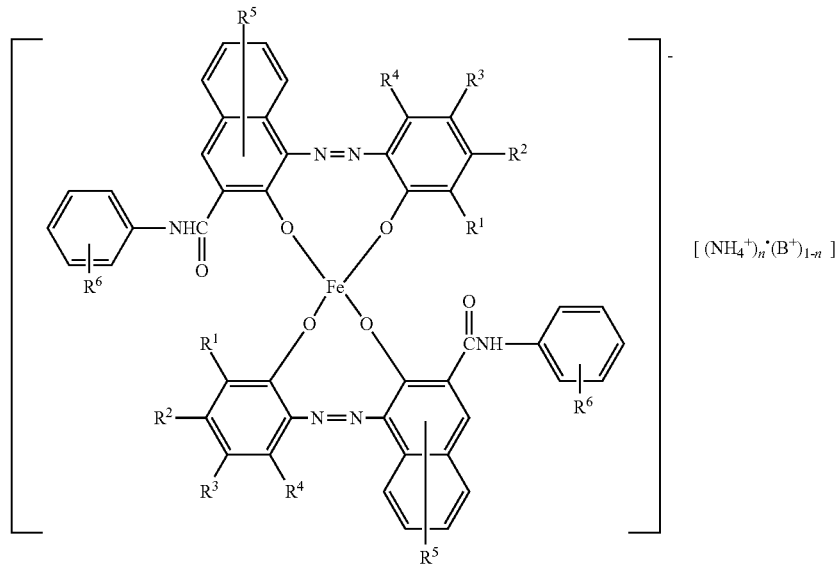

(in the chemical formula [4], $R^1$—, $R^2$—, $R^3$— and $R^4$— are same or different to each other, and one thereof is selected from the groups consisting of a hydrogen atom, an alkyl group of a straight chain or a branch chain having 1 to 18 carbon atoms, an alkenyl group of a straight chain or a branch chain having 2 to 18 carbon atoms, a sulfonamide group being to have a substitutional group, a mesyl group, a hydroxyl group, an alkoxyl group having 1 to 18 carbon atoms, an acetylamino group, a benzoylamino group, a halogen atom, a nitro group and an aryl group being to have a substitutional group, —$R^5$ is a hydrogen atom, an alkyl group of a straight chain or a branch chain having 1 to 18 carbon atoms, a hydroxyl group or an alkoxyl group having 1 to 18 carbon atoms, —$R^6$ is a hydrogen atom, an alkyl group of a straight chain or a branch chain having 1 to 18 carbon atoms, a hydroxyl group, a carboxyl group, a halogen atom or an alkoxyl group having 1 to 18 carbon atoms, $B^+$ is a sodium ion or/and a hydrogen ion, n is the same as in the chemical formula [3]).

According to the method for manufacturing, the charge control agent including the azo-type metal complex salt having the ammonium ion of the counter ion with the high content is manufactured with high purity in high yield efficiently and simply. The manufactured charge control agent has an excellent charge controlling property.

A toner for developing an electrostatic image of the present invention comprises the charge control agent manufactured by the method for manufacturing. The toner has an excellent development property.

As it is mentioned above in detail, according to the method for manufacturing the charge control agent of the present invention, the azo-type metal complex salt having the ammonium counter ion with the high content is manufactured with high purity efficiently and simply in short time. The charge control agent manufactured by this method has the excellent electrification property, the dispersion way into a resin, the fast rise speed of the electrification, and an abundant amount of saturated electrification.

The toner for electrostatic image development prepared with the manufactured charge control agent causes a fast rise speed of the electrification under the high or low speed development of the electrostatic latent image. Further the toner causes the electrifying with sufficient quantity of charge and keeping stable electrification. Electrostatic latent images are formed evenly and vividly. The copied image using the negative electrified toner by the friction is vivid and high quality. The toner causes the faster rise speed of the electrification thereof. So the toner develops the electrostatic latent image clearly and forms vivid images of high resolution, not only under a high speed copying but also under a low speed copying at the rotating speed of at most 600 cm/min. The toner has the excellent copying property.

DETAILED EXPLANATION OF THE INVENTION

Hereunder, embodiments of the method for manufacturing the charge control agent of this invention are explained in detail.

The embodiment of the method for manufacturing the charge control agent including the azo-type metal complex salt having the ammonium ion of the counter ion represented by the above chemical formula [4] is explained.

The monoazo compound as material represented by the following chemical formula [5]

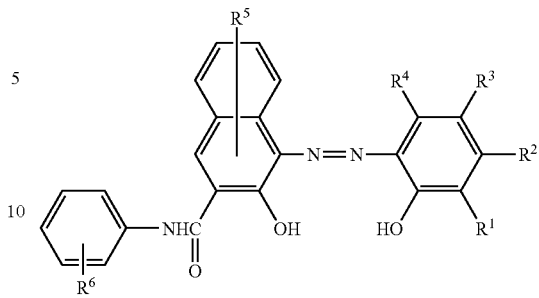

(in the chemical formula [5], $R^1$—, $R^2$—, $R^3$—, $R^4$—, $R^5$— and $R^6$— are the same as the chemical formula [4]) which H of hydroxyl group (—OH) may be substituted alkali metal or $NH_4$ etc., is obtained by diazotization coupling reaction.

In the initiative chelating step as the first step, the monoazo compound is reacted with the iron chelating agent to prepare the azo-type metal complex salt intermediate having iron-chelation with the monoazo compound.

In the subsequent ion-exchanging step as the second step, the azo-type metal complex salt intermediate is reacted with the ammonium counter ion forming agent including the inorganic ammonium salt and the aqueous ammonia in water, the organic solvent or the mixed solvent of water and the organic solvent, preferably the mixed solvent of water and the hydrophilic organic solvent under alkaline condition of higher pH than 8.0, to prepare the azo-type metal complex salt having the ammonium ion of the counter ion represented by the above chemical formula [4].

In next step as the third step, the azo-type metal complex salt was filtrated out and dried to prepare the charge control agent. The charge control agent includes the azo-type metal complex salt having the ammonium counter ion with the high content of 70 mol % or more, preferably 85 mol % or more, further preferably 90 mol % or more.

Incidentally, the diazotization coupling reaction of the previous material-obtaining process may be executed by the general method in water or the mixed solvent of water and the organic solvent, preferably the mixed solvent of water and the hydrophilic organic solvent, to obtain the monoazo compound.

Continuously, the reaction of the iron-chelation in the initiative chelating step by the iron chelating agent may be executed in water or the mixed solvent of water and the organic solvent, preferably the mixed solvent of water and the hydrophilic organic solvent, further preferably the mixed solvent that consists of water and 0.5 to 9.0% by weight furthermore preferably 2.0 to 8.0% by weight of the hydrophilic organic solvent, to prepare the azo-type metal complex salt intermediate.

In the azo-type metal complex salt having the ammonium ion of the counter ion, control of decreasing the ratio of the sodium counter ion content and control of increasing the ratio of ammonium counter ion are important. So it is necessary to determine the amount of sodium ion of the reaction mixture after the diazotization coupling reaction using for instance sodium nitrite in the previous material-obtaining process, and the residual amount of sodium ion of the monoazo compound.

In the initiative chelating step, the amount of sodium hydroxide is varied by subtraction of the residual amount of sodium ion of the monoazo compound. The sodium hydroxide is added to the mixed solvent of water and the hydrophilic organic solvent dispersing the monoazo compound, and then the metal chelating agent preferably the iron chelating agent is added thereto.

In the subsequent ion-exchanging step, the temporary azo-type metal complex salt having sodium ion or/and hydrogen ion as the counter ion is prepared, and then it may be executed the metal-chelation to prepare the desired azo-type metal complex salt having the ammonium ion as the counter ion.

When the subsequent ion-exchanging step is executed in water or the mixed solvent of the organic solvent, especially the mixed solvent of water and either of the alcohol solvent having 1 to 6 carbons or the glycol solvent having 2 to 18 carbons, it is caused low costs, promoting the ion-exchanging reaction, easy crystallization of the azo-type metal complex salt, controlling fine particles of the crystals, and high yield.

The initiative chelating step and the subsequent ion-exchanging step may be executed in the same reactor continuously. Each step thereof may be executed in the separate reactors.

Whenever the reaction of each step is completed, intermediate products may be filtrated out to obtain a wet cake, and then the cake may be dried to obtain a dry cake. The wet or dry cake may be used for next steps.

When the amount of sodium hydroxide in the initiative chelating step, the content of the hydrophilic organic solvent and pH in the subsequent ion-exchanging step are within the above suitable range, the charge control agent is prepared in high yield in short time.

The charge control agent manufactured by the method of the present invention is used for being included into the toner for electrostatic image development or the powder paint.

The toner for developing the electrostatic image of the present invention comprises the above-mentioned charge control agent and the resin for the toner.

Examples of the resin for the toner are a styrene resin, an acrylic resin, an epoxy resin, a vinyl resin and a polyester resin. The toner may comprise colorant, a magnetic material, a fluid improvement agent or an offset prevention agent. The toner may comprise the resin for the toner having high acid value to use for high-speed instruments. It is preferable that the acid value is 20 to 100 mgKOH/g. The toner comprises, for example 100 parts by weight of the resin for the toner, 0.1 to 10 parts by weight of the charge control agent, and 0.5 to 10 parts by weight of the colorant.

The copied image using the negative electrified toner by the friction is vivid and high quality. The toner causes the fast rise speed of the electrification thereof. So the toner develops the electrostatic latent image clearly and forms vivid images of high resolution, not only under high speed copying but also under low speed copying at rotating speed. The toner has the excellent copying property.

As the colorant in the toner of the present invention, known various dyestuffs or pigments are used. Examples of colorant are organic pigments such as quinophtharone yellow, isoindolinone yellow, perinone orange, perinone red, perylene maroon, rhodamine 6G lake, quinacridone red, anthanthrone red, rose bengale, copper phthalocyanine blue, copper phthalocyanine green and diketopyrrolopyrrole; inorganic pigments such as carbon black, titanium white, titanium yellow, ultramarine, cobalt blue, red iron oxide, aluminum powder, bronze; metal powder. And examples of colorant are dyestuffs or pigments treated with higher fatty acids or synthetic resins. The exemplified colorant may be used solely or plurally with mixing.

For improving the quality of the toner, the additive agents may be added to the toner internally or externally. Examples of the additive agents are the offset prevention agent; the fluid improvement agent such as magnesium fluoride and various metal oxides for example silica, aluminum oxide, titanium oxide; a cleaning auxiliary such as a metallic soap for example stearic acid, particulates of various synthetic resin for example fluorine-contained resin particulates, silicone synthetic resin particulates, synthetic styrene-(meth)acrylic resin particulates, and so on.

After the toner is mixed with carrier powder, it is used for developing by a two-component magnetic brush development method and so on. The carrier powder may be all known carrier powder, and is not limited especially. Examples of the carrier powder are the powder of iron or nickel or ferrite whose particle size is ranging from 50 to 200 microns generally, glass beads, the modified powder or beads whose surfaces are coated with an acrylate copolymer, a styrene-acrylate copolymer, a silicone resin, a polyamide resin or a fluoroethylene-contained resin, and so on.

The toner is able to be used for the mono-component development method. On the occasion of the above-mentioned preparing of the toner, it is prepared by adding and dispersing ferromagnetic particulates such as the powder of iron or nickel or ferrite and so on. Examples of the development methods are a contact development method and a jumping development method.

Example of the method for manufacturing the toner is so-called pulverization method. This method is specifically as follows. The resin, a mold lubricant consisting of a material having low softening point, the colorant, the charge control agent and so on are dispersed homogeneously by a pressurized kneader, a extruder or a media dispersing machine. It is pulverized mechanically, or pulverized by collision with targets under jet flow, to prepare the pulverized toner having the desired particle size. Particle size distribution thereof is narrowed through the classification process, to prepare the desired toner.

Moreover, the method of manufacturing the polymerized toner is as follows, for example. The mold lubricant, the colorant, the charge control agent, a polymerization initiator and the other additive agents are added to a monomer. It is dissolved or dispersed homogeneously by a homomixer, an ultrasonic disperser and so on, to prepare a monomer composition. The monomer composition is dispersed in water phase including a dispersion stabilizer by the homomixer and so on. When droplets consisting of the monomer composition are attained to the desired particle size of the toner, granulation is stopped. It is kept under the condition of the same particle size by the effect of the dispersion stabilizer, or gently stirred to prevent from sedimentation thereof. The polymerization reaction is executed at 40 degrees centigrade at least, preferable at 50 to 90 degrees centigrade. In the latter of the polymerization reaction, the temperature may be risen. In the latter of the polymerization reaction, or after the polymerization reaction, a part of the aqueous solvent may be distilled in order to remove together the unreacted monomer, byproducts and so on. In thus suspension polymerization method, it is preferable that 300 to 3000 parts by weight of water as the solvent for the dispersion are used to 100 parts by weight of the monomer composition.

Hereunder, embodiments of the method for manufacturing the charge control agent including the azo-type metal complex salt having the ammonium ion of the counter ion applying the present invention are given in Examples 1 to 9. And embodiments of the method for manufacturing the charge control agent not applying the present invention are given in Comparative Examples 1 to 6.

EXAMPLE 1

An example of the method for manufacturing the charge control agent including the azo-type metal complex salt having the ammonium ion of the counter ion represented by the above chemical formula [4] is explained, referring to the following chemical reaction equations.

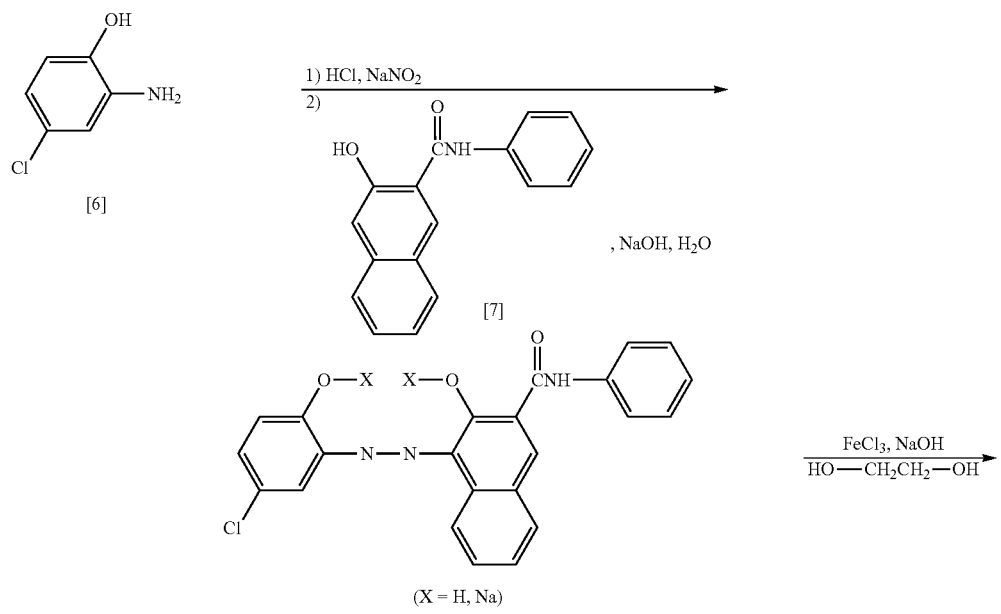
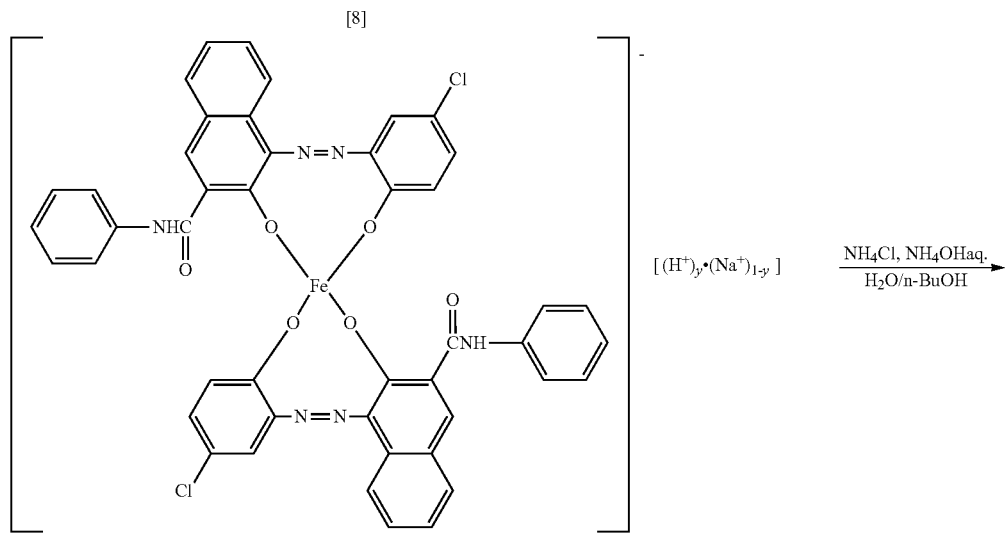
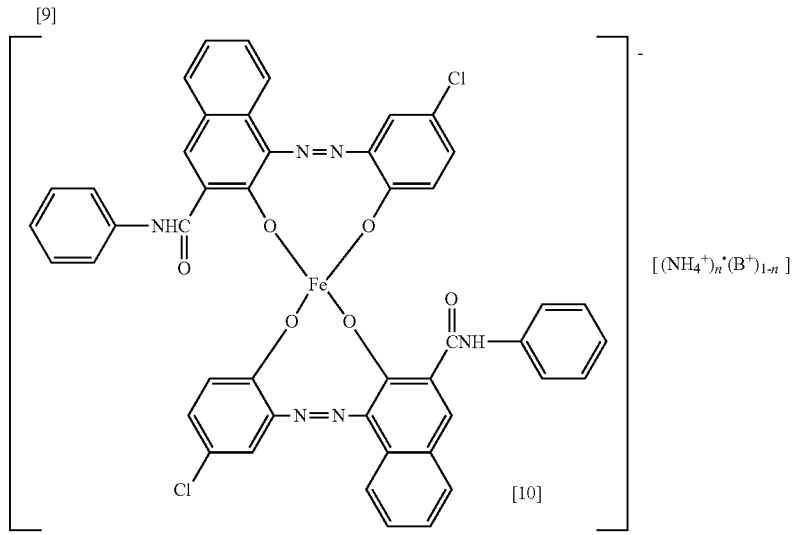

Synthesis of Coloring Matter: The Monoazo Compound 58.1 g of 2-amino-4-chlorophenol (chemical formula [6]) as a starting material and 120.0 g of concentrated hydrochloric acid were added to 680.3 g of water. For diazotization coupling reaction, 36.3 g of 36% sodium nitrite aqueous solution was added thereto gradually with cooling a reaction vessel by ice, to obtain the diazonium salt. The diazonium salt solution was added dropwise in a short time to aqueous solution of 17.4 g of Naphthol AS (chemical formula [7]), 280 g of 20.5% sodium hydroxide aqueous solution and 800 mL of water, and then it was reacted for 2 hours. The precipitated monoazo compound (chemical formula [8]) was filtrated out and washed with water, to obtain 688.4 g of the wet cake having 78.4% of the water content. When a small part of the wet cake of the monoazo compound (chemical formula [8]) was dried and determined the amount of sodium by atomic absorption spectrophotometry, the amount of sodium was 2.88%.

Synthesis of the Charge Control Agent 193.4 g of the wet cake of the monoazo compound (chemical formula [8]) synthesized in the above example of the synthesis of coloring matter was dispersed in 150 g of ethylene glycol. 5.2 g of sodium hydroxide, 8.5 g of iron(III) chloride were added thereto, and refluxed for 2 hours. After cooling, it was filtrated out under reduced pressure, and washed with water, to obtain wet cake of the azo-type metal complex salt intermediate (chemical formula [9]). It was dispersed in 400 g of water and 12 g of n-butanol. The ammonium counter ion forming agent consisted of 13.4 g of ammonium chloride and 10.2 g of 25% aqueous ammonia was added thereto. pH of the reaction mixture was confirmed 8.0 or higher. It was refluxed for 2 hours, to exchange the counter ion. After the reaction, it was cooled. The prepared azo-type metal complex salt having the ammonium ion of the counter ion (chemical formula [10]) was filtrated out and washed with water, to obtain 32.6 g of the desired charge control agent.

The charge control agent was analyzed chemically as follows. (the measurement of the amount of ammonium ion and the amount of sodium ion)

The ratio of the ammonium counter ion content of the charge control agent was measured using atomic absorption spectrophotometer AA-660 that is available from Shimadzu Corporation, and elementary analyzer 2400 II CHNS/O that is available from Perkin Elmer Instruments. As for the counter ions, the ratio of the ammonium ion content was 99.7 mol %.

(The Observation by the Scanning Electron Microscope)

The charge control agent was observed about the particle size and the shape using the scanning electron microscope S2350 that is available from Hitachi, Ltd. When the charge control agent was magnified, it was observed that the size of the primary particulate was 1 to 4 microns and the shape was uniform shape.

EXAMPLES 2 TO 5

The azo-type metal complex salt having the ammonium ion of the counter ion as the desired charge control agent were obtained by the same procedure of Example 1 except for using the ammonium counter ion forming agent, the solvent, reaction temperature, reaction time, controlling of pH under the ion-exchanging as indication in Table 1. The results of pH after the ion-exchanging and the ratio of the ammonium counter ion content of the charge control agent were indicated in Table 1 together.

EXAMPLE 6

104.5 g of the wet cake of the monoazo compound (chemical formula [8]) prepared by the same procedure of Example 1 was dispersed in the mixed solvent of 34.6 g of n-butanol and 350 g of water. 9.2 g of 20.5% sodium hydroxide aqueous solution, that the amount of residual sodium thereof to the converted solid weight of the wet cake is subtracted, was added to the mixed solvent. It was heated at 80 degrees centigrade, and stirred to disperse for 30 minutes. Then 13.1 g of 41% ferric sulfate aqueous solution was added dropwise. It was heated at 96 degrees centigrade, and refluxed for 2 hours, to prepare the azo-type metal complex salt intermediate (chemical formula [9]). Further it was refluxed, 126.9 g of the water and n-butanol were removed using Dean-Stark traps. After cooling until room temperature, 7.1 g of ammonium sulfate and 5.5 g of 25% aqueous ammonia were added thereto. pH of the reaction mixture was confirmed 8.0 or higher. Then it was refluxed for 2 hours at 96 degrees centigrade, to exchange the counter ion. After the reaction, it was cooled. The precipitated azo-type metal complex salt having the ammonium ion of the counter ion (chemical formula [10]) was filtrated out and washed with water, to obtain 21.0 g of the desired charge control agent.

The charge control agent was analyzed as the same as Example 1. The ratio of the ammonium ion content was 94.8 mol %.

EXAMPLE 7

17.4 g of 2-amino-4-chlorophenol (chemical formula [6]) as the starting material and 28.1 g of concentrated hydrochloric acid were added to 130.0 g of water. For diazotization coupling reaction, 23.5 g of 36% sodium nitrite aqueous solution was added thereto gradually with cooling the reaction vessel by ice, to obtain the diazonium salt. The diazonium salt solution was added dropwise in a short time to aqueous solution of 26.3 g of Naphthol AS (chemical formula [7]), 59.9 g of 20.5% sodium hydroxide aqueous solution and 200 g of water, then it was reacted for 2 hours, to obtain the reaction mixture including the precipitated monoazo compound (chemical formula [8]). 12.4 g of butanol and 23.9 g of 41% ferric sulfate aqueous solution were added dropwise to the reaction mixture. It was refluxed for 2 hours. After cooling, it was filtrated out and washed with water, to obtain 105.1 g of wet cake of the azo-type metal complex salt intermediate (chemical formula [9]) having 56.3% of the water content.

The wet cake of the azo-type metal complex salt intermediate (chemical formula [9]) was dispersed in 344.0 g of water. 12.1 g of n-butanol, 3.3 g of ammonium sulfate and 13.7 g of 25% aqueous ammonia were added thereto. pH of the reaction mixture was confirmed 8.0 or higher. It was refluxed for 2 hours to exchange the counter ion. After cooling, the prepared azo-type metal complex salt having the ammonium ion of the counter ion (chemical formula [10]) was filtrated out, and washed with water, to obtain 29.2 g of the desired charge control agent.

The charge control agent was analyzed as the same as Example 1. The ratio of the ammonium ion content was 96.5 mol %.

EXAMPLE 8

17.4 g of 2-amino-4-chlorophenol (chemical formula [6]) as the starting material and 28.1 g of concentrated hydrochloric acid were added to 130.0 g of water. For diazotization coupling reaction, 23.5 g of 36% sodium nitrite aqueous solution was added thereto gradually with cooling the reaction vessel by ice, to obtain the diazonium salt. The diazonium salt solution was added dropwise in a short time to aqueous solution of 26.3 g of Naphthol AS (chemical formula

[7]), 59.9 g of 20.5% sodium hydroxide aqueous solution and 200 g of water, then it was reacted for 2 hours, to obtain the reaction mixture including the precipitated monoazo compound (chemical formula [8]). 12.4 g of n-butanol and 23.9 g of 41% ferric sulfate aqueous solution were added dropwise to the reaction mixture. It was refluxed for 2 hours, to prepare the azo-type metal complex salt intermediate (chemical formula [9]). After cooling until room temperature, 3.3 g of ammonium sulfate and 10.2 g of 25% aqueous ammonia were added thereto. pH of the reaction mixture was confirmed 8.0 or higher. It was heated at 97 degrees centigrade and refluxed for 2 hours to exchange the counter ion. After the reaction, the precipitated azo-type metal complex salt having the ammonium ion of the counter ion (chemical formula [10]) was filtrated out, and washed with water, to obtain 42.2 g of the desired charge control agent.

The charge control agent was analyzed as the same as Example 1. The ratio of the ammonium ion content was 77.2 mol %.

EXAMPLE 9

200.0 g of the wet cake of the monoazo compound (chemical formula [8]) prepared by the same procedure of Example 1 was dispersed in the mixed solvent of 32.2 g of n-butanol and 252.6 g of water. 18.9 g of 20.5% sodium hydroxide aqueous solution, that the amount of residual sodium thereof to the converted solid weight of the wet cake is subtracted, was added to the mixed solvent. It was heated at 80 degrees centigrade, and stirred to disperse for 30 minutes. Then 24.6 g of 41% ferric sulfate aqueous solution was added dropwise. It was refluxed for 2 hours, to prepare the azo-type metal complex salt intermediate (chemical formula [9]). Further it was refluxed, 34.6 g of the water and n-butanol were removed using Dean-Stark traps. After cooling until room temperature, 20.9 g of 25% aqueous ammonia were added. pH of the reaction mixture was confirmed 8.0 or higher. Then it was refluxed for 2 hours to exchange the counter ion. After the reaction, it was cooled. The prepared azo-type metal complex salt having the ammonium ion of the counter ion (chemical formula [10]) was filtrated out and washed with water, to obtain 37.3 g of the desired charge control agent.

The obtained charge control agent is dried, to form aggregated lumps of approximate 1 mm to several cm. The lumps were crushed with the agitator mill or mashed with the mortar, to be powdery.

The charge control agent was analyzed as the same as Example 1. The ratio of the ammonium ion content was 84.8 mol %.

TABLE 1

Reaction Condition of Subsequent Ion-exchanging Step and Analysis Results of Azo-type Metal Complex Salt

| Ex. Nos. | Ammonium Counter Ion Forming Agent | Solvent | Reaction Temp. | Reaction Time (H) | Controlling of pH | pH (After Ion-exchanging) | Ratio of Ammonium Counter Ion Content (mol %) |
|---|---|---|---|---|---|---|---|
| 1 | $NH_4Cl$(5eq.) aq. $NH_3$(3eq.) | 3%n-Butanol/Water | Reflux | 1 | Only Ammonium Counter Ion Forming Agent | 9.26 | 99.7 |
| 2 | $NH_4Cl$(5eq.) aq. $NH_3$(3eq.) | Methanol | Reflux | 1 | Only Ammonium Counter Ion Forming Agent | 8.02 | 96.3 |
| 3 | $NH_4Cl$(5eq.) aq. $NH_3$(3eq.) | Methanol | Room Temp. | 1 | Only Ammonium Counter Ion Forming Agent | 8.88 | 97.6 |
| 4 | $NH_4Cl$(1eq.) aq. $NH_3$(1eq.) | Methanol | Reflux | 1 | Only Ammonium Counter Ion Forming Agent | 8.20 | 87.7 |
| 5 | $NH_4Cl$(1eq.) aq. $NH_3$(0.5eq.) | Methanol | Reflux | 1 | Only Ammonium Counter Ion Forming Agent | 5.85 | 83.4 |
| 6 | $(NH_4)_2SO_4$(4eq.) aq. $NH_3$(3eq.) | Approx. 3%n-Butanol/Water | Reflux | 2 | Only Ammonium Counter Ion Forming Agent | 8.40 | 94.8 |
| 7 | $(NH_4)_2SO_4$(4eq.) aq. $NH_3$(4eq.) | Approx. 3%n-Butanol/Water | Reflux | 2 | Only Ammonium Counter Ion Forming Agent | 9.10 | 96.5 |

TABLE 1-continued

Reaction Condition of Subsequent Ion-exchanging Step and Analysis Results of Azo-type Metal Complex Salt

| Ex. Nos. | Ammonium Counter Ion Forming Agent | Solvent | Reaction Temp. | Reaction Time (H) | Controlling of pH | pH (After Ion-exchanging) | Ratio of Ammonium Counter Ion Content (mol %) |
|---|---|---|---|---|---|---|---|
| 8 | $(NH_4)_2SO_4$(1eq.) aq. $NH_3$(3eq.) | Approx. 3%n-Butanol/ Water (Continual) | Reflux | 2 | Only Ammonium Counter Ion Forming Agent | 9.00 | 77.2 |
| 9 | aq. $NH_3$(6eq.) | Approx. 3%n-Butanol/ Water (Continual*) | Reflux | 2 | Only Ammonium Counter Ion Forming Agent | 10.20 | 84.8 |

Continual*: the initiative chelating step and the subsequention-exchanging step are continual.

COMPARATIVE EXAMPLES 1 TO 6

The azo-type metal complex salt having the counter ion as the charge control agent were obtained by the same procedure of Example 1 except for using the ammonium counter ion forming agent, the solvent, reaction temperature, reaction time, controlling of pH under the ion-exchanging as indication in Table 2. The results of pH after the ion-exchanging and the ratio of the ammonium counter ion content of the charge control agent were indicated in Table 2 together.

It was evident with Table 1 and Table 2 that the charge control agent including the azo-type metal complex salt having the ammonium ion of the counter ion of Examples 1 to 9 had 77 mol % or more of the ammonium counter ion content with high purity in high yield. These charge control agent had the excellent charge controlling property.

While the charge control agent including the azo-type metal complex salt having the counter ion of Comparative Examples 1 to 6 had 52.9 mol % of the ammonium counter ion content at the maximum that is not so high.

TABLE 2

Reaction Condition of Subsequent Ion-exchanging Step and Analysis Results of Azo-type Metal Complex Salt

| Comparative Ex. Nos. | Ammonium Counter Ion Forming Agent | Solvent | Reaction Temp. | Reaction Time (H) | Controlling of pH | pH (After Ion-exchanging) | Ratio of Ammonium Counter Ion Content (mol %) |
|---|---|---|---|---|---|---|---|
| 1 | $NH_4Cl$(5eq.) | Water | Room Temp. | 1 | Only Ammonium Counter Ion Forming Agent | 4.84 | 2.6 |
| 2 | $NH_4Cl$(5eq.) | Water | Reflux | 11.5 | Only Ammonium Counter Ion Forming Agent | 3.38 | 18.6 |
| 3 | $NH_4Cl$(5eq.) | 3%n-Butanol/ Water | Reflux | 1 | Only Ammonium Counter Ion Forming Agent | 4.24 | 7.1 |
| 4 | $NH_4Cl$(5eq.) | 3%n-Butanol/ Water | Reflux | 1 | Addition of NaOHaq. | 9.20 | 52.9 |
| 5 | $Nh_4Cl$(5eq.) | Methanol | Reflux | 1 | Only Ammonium Counter Ion Forming Agent | 4.01 | 10.3 |
| 6. | aq. $NH_3$(5eq.) | Methanol | Reflux | 5 | Only Ammonium Counter Ion Forming Agent | 10.50 | 51.7 |

EXAMPLE 10

Preparation of the Toner and a Developer 1 part by weight of the charge control agent prepared in Example 1, 100 parts by weight of styrene-acrylic copolymer CPR-600 B that is available from Mitsui Chemicals, Inc., 6 parts by weight of carbon black MA-100 that is available from Mitsubishi Chemical Corporation, and 2 parts by weight of low-grade polypropylene VISCOL 550P that is available from Sanyo Kasei Industries, Ltd.

were mixed beforehand, to prepare a pre-mix. The pre-mix was melted and kneaded. After cooling, it was crushed coarsely by an ultra-centrifugal crusher. The obtained coarse crushing material was pulverized finely using an air jet mill attached a classifier, to obtain the black toner having 5 to 15 microns of particle size.

5 parts by weight of the toner and 95 parts by weight of iron powder carrier TEFV200/300 that is available from Powder Tech Corporation were loaded in three drums respectively. Developing rollers confronted thereof were rotated at rotation speed of (A) 1200 cm/minute, (B) 900 cm/minute, and (C) 600 cm/minute. The quantity of the frictional electrification of the toner with passage of time was determined by blow-off method using an instrument TB-200, that the blow-off measuring instrument of the quantity of the electrification is available from Toshiba Chemical Corporation. It has stable and excellent electrification property.

Using this developer, forming images tests were executed under the condition at 26 to 29 degrees centigrade with 55 to 63% of humidity, and under the condition at 34 to 36 degrees centigrade with 78 to 80% of humidity. Under each condition, both formed images had identical high quality.

EXAMPLE 11

The black toner was prepared as the same as Example 10, except for using the charge control agent of Example 4 instead of the charge control agent of Example 1. The quantity of the frictional electrification was determined by blow-off method. It has stable and excellent electrification property.

Using this developer, forming images tests were executed under the condition at 26 to 29 degrees centigrade with 55 to 63% of humidity, and under the condition at 34 to 36 degrees centigrade with 78 to 80% of humidity. Under each condition, both formed images had identical high quality.

EXAMPLE 12

After 450 parts by weight of 0.1 mol/L $Na_3PO_4$ aqueous solution was added to 710 parts by weight of deionized water, it was heated at 60 degrees centigrade. Stirring by 5000 rpm using T.K. HOMO MIXER that is available from Tokushu Kika Kogyo Co., Ltd., 68 parts by weight of 1.0 mol/L $CaCl_2$ aqueous solution was added gradually, to prepare water dispersed $Ca(PO_4)_2$.

The other hand, 170 parts by weight of styrene monomer, 25 parts by weight of carbon, 4 parts by weight of the dispersed solution, and 9 parts by weight of the azo-type iron complex salt (chemical formula [10]) of Example 1 were added to DYNO-MILL ECM-PIROT that is available from Shinmaru Enterprises Corporation. It was stirred to disperse with 0.8 mm of zirconia beads using a stirring paddle-blade at 10 m/sec. of peripheral speed for 3 hours, to obtain the dispersed solution. 10 parts by weight of 2,2-azobis(2,4-dimethylvaleronitrile) was added to the dispersed solution at 60 degrees centigrade, to prepare the monomer composition.

The monomer composition was added to the water dispersed $Ca(PO_4)_2$. It was stirred at 1000 rpm for 15 minuets, to granulate. Then it was stirred using stirring paddle-blades at 80 degrees centigrade for 10 hours, to polymerize. After the reaction, the unreacted monomer was removed under reduced pressure. After cooling, hydrochloric acid was added to dissolve $Ca(PO_4)_2$. It was filtrated out, washed with water, and dried, to obtain the black toner.

5 parts by weight of the obtained black toner and 95 parts by weight of ferrite carrier were mixed, to obtain the developer.

Using this developer, forming images tests were executed under the condition at 26 to 29 degrees centigrade with 55 to 63% of humidity, and under the condition at 34 to 36 degrees centigrade with 78 to 80% of humidity. Under each condition, both formed images had identical high quality.

What is claimed is:

1. A method for manufacturing a charge control agent comprising:

an initial chelating step of reacting a monoazo compound represented by the following chemical formula [1] and a trivalent metal chelating agent, to prepare an azo-type metal complex salt intermediate:

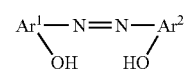

[1]

wherein $Ar^1$ and $Ar^2$ are the same or different from each other, and are substituted or unsubstituted aromatic groups;

a subsequent ion-exchanging step of reacting the azo-type metal complex salt intermediate and a composition for forming an ammonium counter ion including an inorganic ammonium salt and aqueous ammonia, to prepare an azo-type metal complex salt having an ammonium counter ion represented by the following chemical formula [2]:

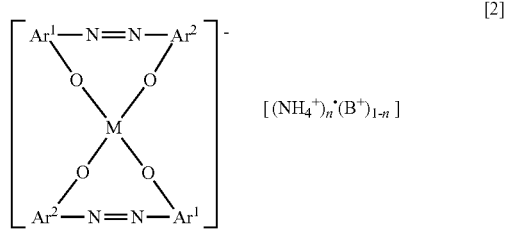

[2]

wherein M is a trivalent metal;

B⁺ is a cation other than ammonium ion; and n is a number from 0.70 to 1.00.

2. The method according to claim 1, wherein the trivalent metal chelating agent is an iron(III) chelating agent, and the azo-type metal complex salt having the ammonium counter ion is represented by the following chemical formula [3]:

6. The method according to claim 1, wherein at least the subsequent ion-exchanging step is performed in a hydrophilic organic solvent or a mixed solvent of water and the hydrophilic organic solvent.

7. The method according to claim 6, wherein the hydrophilic organic solvent is one or more of an alcohol solvent having 1 to 6 carbons and a glycol solvent having 2 to 18 carbons.

8. The method according to claim 2, wherein the azo-type metal complex salt having the ammonium counter ion of chemical formula [3] is further represented by the following chemical formula [4]:

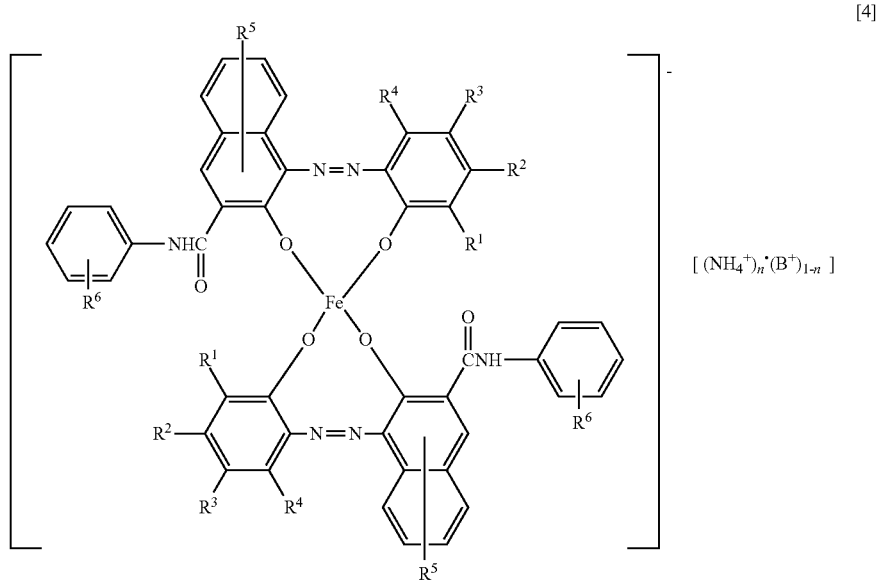

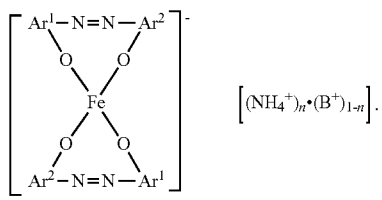

3. The method according to claim 1, wherein the composition for forming the ammonium counter ion includes 1 to 20 equivalents of the inorganic ammonium salt and 0.5 to 20 equivalents of the aqueous ammonia to 1 equivalent of the azo-type metal complex salt intermediate.

4. The method according to claim 1, wherein the composition for forming the ammonium counter ion controls the pH of the reaction mixture during the ion-exchanging step at higher than 8.0.

5. The method according to claim 1, wherein the composition for forming the ammonium counter ion controls the pH of the reaction mixture at higher than 8.0 after the ion-exchanging step.

wherein $R^1$, $R^2$, $R^3$ and $R^4$ are the same or different from each other, and each one thereof is selected from the group consisting of a hydrogen atom, a straight-chain or a branched-chain alkyl group having 1 to 18 carbon atoms, a straight-chain or a branched-chain alkenyl group having 2 to 18 carbon atoms, a substituted or unsubstituted sulfonamide group, a mesyl group, a hydroxyl group, an alkoxyl group having 1 to 18 carbon atoms, an acetylamino group, a benzoylamino group, a halogen atom, a nitro group and a substituted or unsubstituted aryl group;

$R^5$ is a hydrogen atom, a straight-chain or a branched-chain alkyl group having 1 to 18 carbon atoms, a hydroxyl group or an alkoxyl group having 1 to 18 carbon atoms;

$R^6$ is a hydrogen atom, a straight-chain or a branched-chain alkyl group having 1 to 18 carbon atoms, a hydroxyl group, a carboxyl group, a halogen atom or an alkoxyl group having 1 to 18 carbon atoms; and B⁺ is a sodium ion and/or a hydrogen ion.

* * * * *